United States Patent Office 3,075,965
Patented Jan. 29, 1963

3,075,965
SULFATION OF ALCOHOLS AND POLYOLS WITH SALTS OF ACETYL SULFURIC ACID
George P. Touey and John E. Kiefer, Kingsport, Tenn., assignors to Eastman Kodak Company, Rochester, N.Y., a corporation of New Jersey
No Drawing. Filed Sept. 16, 1960, Ser. No. 56,345
6 Claims. (Cl. 260—234)

This invention relates to a method of sulfating alcohols and polyols having a molecular weight less than 5000 with certain salts of acetyl sulfuric acid.

Sulfuric acid, oleum, chlorosulfonic acid and sulfur trioxide have previously been employed to sulfate alcohols and other hydroxyl-containing compounds. As a group, it may be said that these sulfating agents tend to char sensitive organic compounds. Thus, sugar or sugar derivatives, for example, cannot be sulfated with these sulfating agents without caramelizing large amounts of sugar. Individually, each of the sulfating agents noted is characterized by one or more disadvantages. Sulfuric acid forms a molar equivalent of water for each mole of sulfate ester produced, thus requiring the use of excess sulfuric acid. The excess sulfuric acid remaining at the end of the sulfation is difficult to remove and is ordinarily neutralized with alkali. Hence, the sulfated product contains large amounts of alkali sulfate salts as inert impurities. The same disadvantage occurs when oleum is employed as the sulfating agent, except that the use of oleum reduces the amount of excess sulfuric acid required. Chlorosulfonic acid reacts quantitatively with many alcohols, but hydrogen chloride is formed and remains in the sulfated product as a salt contamination since removal therefrom is difficult. Sulfur trioxide reacts quantitatively with many alcohols and eliminates the disadvantages encountered in the use of sulfuric acid, oleum and chlorosulfonic acid as sulfating agents. However, sulfation with sulfur trioxide, being extremely exothermic, is difficult to control and often chars and colors the sulfated material. Moreover, sulfur trioxide is hard to handle since it fumes profusely when exposed to air.

One object of our invention is to provide a new method of sulfating alcohols and polyols having a molecular weight less than 5000. Another object of our invention is to provide a method of sulfating acid sensitive alcohols and polyols without charring or coloring the material. A further object of our invention is to provide a method of sulfating alcohols and polyols with a sulfating agent which will react quantitatively therewith. Still another object of our invention is to provide a method of sulfating alcohols and polyols so that a sulfated product of high purity is formed. A still further object of our invention is to sulfate alcohols and polyols with certain salts of acetyl sulfuric acid. Other objects of our invention will appear herein.

We have found that the use of certain salts of acetyl sulfuric acid as a sulfating agent eliminates the disadvantages which have heretofore been encountered in the sulfation of alcohols and polyols having a molecular weight less than 5000. We have found that highly pure sulfate esters of alcohols and polyols may be prepared without charring and color formation by treating the alcohol or polyol with an alkali metal, ammonium or amine salt of acetyl sulfuric acid.

In its broadest aspects, this invention comprises reacting on alcohols and polyols having a molecular weight less than 5000 with a salt of acetyl sulfuric acid. Suitable salts of acetyl sulfuric acid are the alkali metal, ammonium and amine salts. The reaction may be carried out at 0° to 50° C. We prefer to use the sodium salt of acetyl sulfuric acid and to carry out the reaction at 0° to 30° C. The acetic acid formed in the sulfation reaction may be removed by neutralizing any sulfuric acid present and either distilling off the acetic acid or precipitating and filtering the alcohol sulfate ester formed. In some instances it may be desirable to employ a small amount of sulfuric acid as a catalyst in the sulfation procedure.

The sodium salt of acetyl sulfuric acid may be prepared by dissolving 1 mole of sodium bisulfate in 1 to 3 moles of acetic anhydride or by adding 1 mole of sodium acetate to a solution of 1 mole of sulfuric acid dissolved in 1 to 3 moles of acetic anhydride. In a preferred method of preparing sodium acetyl sulfuric acid, 0.5 mole of sodium sulfate is slurried in 1 to 3 moles of acetic anhydride and then 0.5 mole of sulfuric acid is added. The temperature of the mixture in each of the above reactions should be held below 40 to 50° C., and preferably between 0° and 30° C. At higher temperatures, acetyl sulfuric acid rearranges to sulfoacetic acid, which is not a sulfating agent. The sodium acetyl sulfuric acid salt may be isolated by precipitation with an inert organic solvent which is a nonsolvent for the salt. Aromatic and aliphatic hydrocarbons and chlorinated hydrocarbons have been found suitable for this purpose. However, in many cases it is not necessary to isolate the sulfating agent. Thus, a mixture of sodium acetyl sulfuric acid salt, acetic acid, acetic anhydride and a catalytic amount of sulfuric acid can be added to an alcohol to produce an alcohol sulfate.

The alcohols and polyols which may be sulfated in accordance with our invention include alcohols, glycols, monoglycerides, diglycerides, ethenoxylated or propenoxylated alcohols, and polyglycols such as polyethylene, polypropylene, or polybutylene glycol. Sugars, such as glucose, sorbitol, mannose, fructose, lactose and mannitol; sugar derivatives such as α-methyl glucoside, isosorbide; and, sugar esters such as glucose mono- and dipalmitate, glucose mono- and distearate and sucrose mono- and dipalmitate may be sulfated in good yield according to our invention. The sulfate esters made in accordance with the present invention are useful as detergents, emulsifying agents, wetting agents and the like.

The following examples illustrate the sulfation of several types of hydroxyl containing compounds in accordance with our invention.

*Example 1*

1 mole of sulfuric acid was dissolved in 2 moles of acetic anhydride at 5° C. 0.95 mole of anhydrous sodium acetate was added and the mixture was slurried at 5° C. until the salt was completely dissolved. This solution was slowly added (over a period of 30 min.) to 3 moles of isobutyl alcohol. The sodium isobutyl sulfate precipitated from the excess isobutyl alcohol. It was isolated by filtration, then washed with toluene and dried.

*Analysis.*—27.0% carbon, 5.0% hydrogen, and 18.4% sulfur.

Theory for sodium isobutyl sulfate 27.3% carbon, 5.1% hydrogen and 18.2% sulfur. The yield of the sodium isobutyl sulfate was calculated to be 98% based on the sulfuric acid.

The sodium isobutyl sulfate prepared above can be used as an alkylating agent for introducing the isobutyl group into alcohols and carbohydrates:

$ROH + (CH_3)_2-CH-CH_2OSO_3Na$
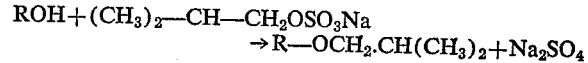

*Example 2*

Sodium sulfate (0.47 mole) was slurried in 2 moles of acetic anhydride. The slurry was cooled to 10° C. and 0.53 mole of sulfuric acid was added. When the salt was completely dissolved, the solution was added to 0.5 mole of a water insoluble polypropylene glycol with a molecular weight of 2010. The addition was made over a period of 30 minutes and the temperature was held at 10° C. during the addition. The solution was neutralized with 0.06 mole of anhydrous sodium acetate. The acetic acid and excess acetic anhydride were removed by distillation in vacuo. The product was a pale yellow very viscous water soluble liquid. It contained 2.83% sulfur. This product had good surface active properties. The surface tension of an 0.0625% aqueous solution was 40.4 dynes/cm. as measured by a Du Nuoy Interfacial Tensiometer. It was an excellent emulsifying agent for oil in water type emulsions.

Example 3

Sodium sulfate (0.47 mole) was slurried in 2 moles of acetic anhydride. The slurry was cooled to 10° C. and 0.53 mole of sulfuric acid was added. When the salt had completely dissolved, the solution was added to 1 mole of glucose dissolved in 10 parts by weight of dimethylformamide. The addition was made over a period of 30 minutes and the temperature was held at 10° C. during the addition. The solution was then neutralized with 0.06 mole of sodium acetate. The product was then precipitated by pouring the reaction solution into ethyl alcohol. It was washed in ethyl alcohol and dried. The sodium glucose sulfate was obtained in 94% yield as a white crystalline solid.

*Analysis.*—25.3% carbon, 4.0% hydrogen, and 11.5% sulfur.

Example 4

Sodium sulfate (0.47 mole) was slurried in 2 moles of acetic anhydride. The slurry was cooled to 10° C., and 0.53 mole of sulfuric acid was added. When the salt had completely dissolved, the solution was added to 1 mole of sucrose dipalmitate dissolved in 10 parts by weight of dimethylformamide. The addition was made over a period of 30 minutes and the temperature was held at 10° C. during the addition. The solution was then neutralized with 0.06 mole of anhydrous sodium acetate. The dimethylformamide, acetic acid, and acetic anhydride were removed in vacuo. The product was a white crystalline solid containing 3.4% sulfur. It was found to be an excellent emulsifier for oil and water systems.

Example 5

Sodium sulfate (0.47 mole) was slurried in 2 moles of acetic anhydride. The slurry was cooled to 10° C. and 0.53 mole of sulfuric acid was added. When the salt had completely dissolved, the solution was added to 1 mole of glycerol monostearate dissolved in 10 parts by weight of dimethylformamide. The addition was made over a period of 30 minutes. The temperature was held at 10° C. during the addition. The solution was neutralized with 0.06 mole of anhydrous sodium acetate. The dimethylformamide, acetic acid and acetic anhydride were removed in vacuo. The product contained 5.9% sulfur. It was found to be a good emulsifying agent for oil in water emulsions.

We claim:

1. A method of preparing sulfate esters of sugar compounds which comprises reacting a sugar compound having a molecular weight less than 5000 with an alkali metal salt of acetyl sulfuric acid at a temperature of 0–30° C.

2. A method of preparing sulfate esters of lower glycerides which comprises reacting a lower glyceride having a molecular weight less than 5000 with an alkali metal salt of acetyl sulfuric acid at a temperature of 0–30° C.

3. A method of preparing sulfate esters of alcohols and polyols which comprises reacting a compound selected from the group consisting of the alcohols and polyols having a molecular weight less than 5000 with a salt, selected from the group consisting of the alkali metal, ammonium and amine salts, of acyl sulfuric acid at a temperature of 0–50° C.

4. A method of preparing sulfate esters of alcohols and polyols which comprises reacting a compound selected from the group consisting of the alcohols and polyols having a molecular weight less than 5000 with an alkali metal salt of acetyl sulfuric acid at a temperature of 0–30° C.

5. A method of preparing sulfate esters of alcohols and polyols which comprises reacting a compound selected from the group consisting of the alcohols and polyols having a molecular weight less than 5000 with the ammonium salt of acetyl sulfuric acid at a temperature of 0–30° C.

6. A method of preparing sulfate esters of alcohols and polyols which comprises reacting a compound selected from the group consisting of the alcohols and polyols having a molecular weight less than 5000 with an amine salt of acetyl sulfuric acid at a temperature of 0–30° C.

References Cited in the file of this patent

"Encyclopedia of Chemical Technology," vol. 13, 1954, pp. 317, 326 and 334–337.